US 8,516,784 B2

(12) United States Patent
Abrisketa Lozano

(10) Patent No.: US 8,516,784 B2
(45) Date of Patent: Aug. 27, 2013

(54) APPARATUS FOR VERTICALLY LINKING TWO SECTIONS OF CHAIN

(71) Applicant: Vicinay Cadenas, S.A., Bilbao (ES)

(72) Inventor: Nagore Abrisketa Lozano, Bilbao (ES)

(73) Assignee: Vicinay Cadenas, S.A., Bilbao (Vizcaya) (ES)

( * ) Notice: Subject to any disclaimer, the term of this patent is extended or adjusted under 35 U.S.C. 154(b) by 0 days.

(21) Appl. No.: 13/706,463

(22) Filed: Dec. 6, 2012

(65) Prior Publication Data

US 2013/0091823 A1    Apr. 18, 2013

Related U.S. Application Data

(63) Continuation of application No. PCT/SE2011/070326, filed on May 6, 2011.

(30) Foreign Application Priority Data

Jun. 7, 2010 (ES) .................................. 201030870

(51) Int. Cl.
*F16G 15/06* (2006.01)
*B66C 1/38* (2006.01)

(52) U.S. Cl.
USPC ..................... 59/86; 59/85; 59/93; 294/82.35

(58) Field of Classification Search
USPC ..................... 59/85, 86, 93; 294/82.23, 82.35
See application file for complete search history.

(56) References Cited

U.S. PATENT DOCUMENTS

| 6,719,497 | B1 | 4/2004 | Pollack et al. |
| 7,134,268 | B2 * | 11/2006 | Siappas ............................ 59/86 |
| 7,614,209 | B1 * | 11/2009 | Payne et al. ...................... 59/86 |
| 8,240,728 | B2 * | 8/2012 | Hwang et al. .............. 294/82.35 |
| 2013/0019582 | A1 * | 1/2013 | Abrisketa Lozano ........... 59/86 |

FOREIGN PATENT DOCUMENTS

| AU | 2010212330 | 3/2011 |
| WO | 2006/055581 | 5/2006 |

OTHER PUBLICATIONS

International Search Report issued Sep. 13, 2011 in International (PCT) Application No. PCT/ES2011/070326.

* cited by examiner

*Primary Examiner* — David B Jones
(74) *Attorney, Agent, or Firm* — Wenderoth, Lind & Ponack, L.L.P.

(57) ABSTRACT

The apparatus is intended for vertically linking a first chain and a second chain under water. The apparatus is characterized in that it comprises a lower base (1) with an open cross-shaped slot (5) into which the last link of the first chain (6) is inserted, extending above said lower base (1), while a guide/holder (2) for the second chain (7) is attached to the lower base (1) over said slot, said guide/holder containing an H-shaped shackle (11) that is coupled to the last link of said second chain (7) by means of a first bolt (12), the last link of the first chain (6) being inserted in the free space in the shackle (11) so that both chains (6-7) are coupled by means of a second bolt (13).

12 Claims, 4 Drawing Sheets

APPARATUS FOR VERTICALLY LINKING TWO SECTIONS OF CHAIN

OBJECT OF THE INVENTION

The present invention, as expressed in the title of this specification, relates to an apparatus for vertically linking two sections of chain, provided for connecting two chains or sections of chain on the seabed or in another water medium, always under the free water surface, being especially applicable to chains used in the marine industry, for example, immersion and/or withdrawal of equipment, machines, etc. in the sea.

Therefore, the object of the invention is to provide a characteristic apparatus for vertically linking chains that allows an easy assembly under the sea of the chain links to be coupled.

BACKGROUND OF THE INVENTION

The chains used in the marine industry for anchoring or other applications are large and therefore very heavy and difficult to handle. Furthermore, said chains often undergo wear and frequently deteriorate over time, requiring the replacement of damaged parts.

This replacement is usually performed in the sea water, or by bringing the chains needing linking out of the water to replace the damaged parts, such operations being complicated due to their size and hence the weight of the elements to be handled and subsequently linked. If these operations are to be performed on land, they become too expensive.

On the other hand there are also several ways of performing such replacements under the sea, the most common being the use of divers wearing diving suits or by using special robots. The problem is that at the time of performing the chain replacement, it is carried out with the chain in a vertical position without any kind of support, complicating the replacement task due to the inconvenience of not having the chain supported by any additional element that could help with the chain-linking work.

DESCRIPTION OF THE INVENTION

In order to achieve the objectives and avoid the drawbacks mentioned in the preceding sections, the invention proposes an apparatus for vertically linking two chains or sections of chain that facilitates their linking on the seabed.

The device is characterised in that in principle it comprises a lower base, on which is mounted a guiding bracket, an assembly device and a locking device.

The lower base, the guiding bracket and both the devices can be linked to the lower base permanently, or may be removable, this being the preferred embodiment so that if any of the parts of the apparatus as a whole is damaged, it will be easy to solve the problem by replacing the damaged part or parts.

The lower base incorporates a characteristic open cross-shaped slot, into which the last link of the first chain on the seabed is inserted from below in a proper position, said link extending above said lower base fitting into one of the two spaces of an H-shaped shackle previously coupled at its other twin space and by a first bolt to the link of a second chain which descends from the free water surface (of the sea) so that the shackle fits stably within the guiding bracket, a position in which the space delimited by the last link of the first chain will be faced with the pair of free facing spaces of the shackle, at which time a second link is inserted to couple both chains, initiating its introduction through the assembly device incorporating a tubular body inside which said second bolt is inserted, moving it axially with a guided pusher element in that same tubular body.

Lastly, the locking device secures the axial attachment of the second bolt by means of an anchoring sleeve coupled at one threaded end of said bolt, while it is immobilized by a pin.

Once the anchoring sleeve has been screwed onto the second bolt, the locking device is placed in an inactive position to thus extract the set of the two chains together.

A major advantage offered by the apparatus of the invention is that neither the assembly device nor the locking device are attached to the "H"-shaped shackle, as happens conventionally, thus avoiding having to cut or disengage these two devices underwater.

Hereunder, in order to provide a better understanding of this specification and forming an integral part thereof, a number of figures are attached which with a purely illustrative purpose and without limiting the scope of this invention depict the object of the latter.

DESCRIPTION OF THE PREFERRED EMBODIMENT

Figure 1:
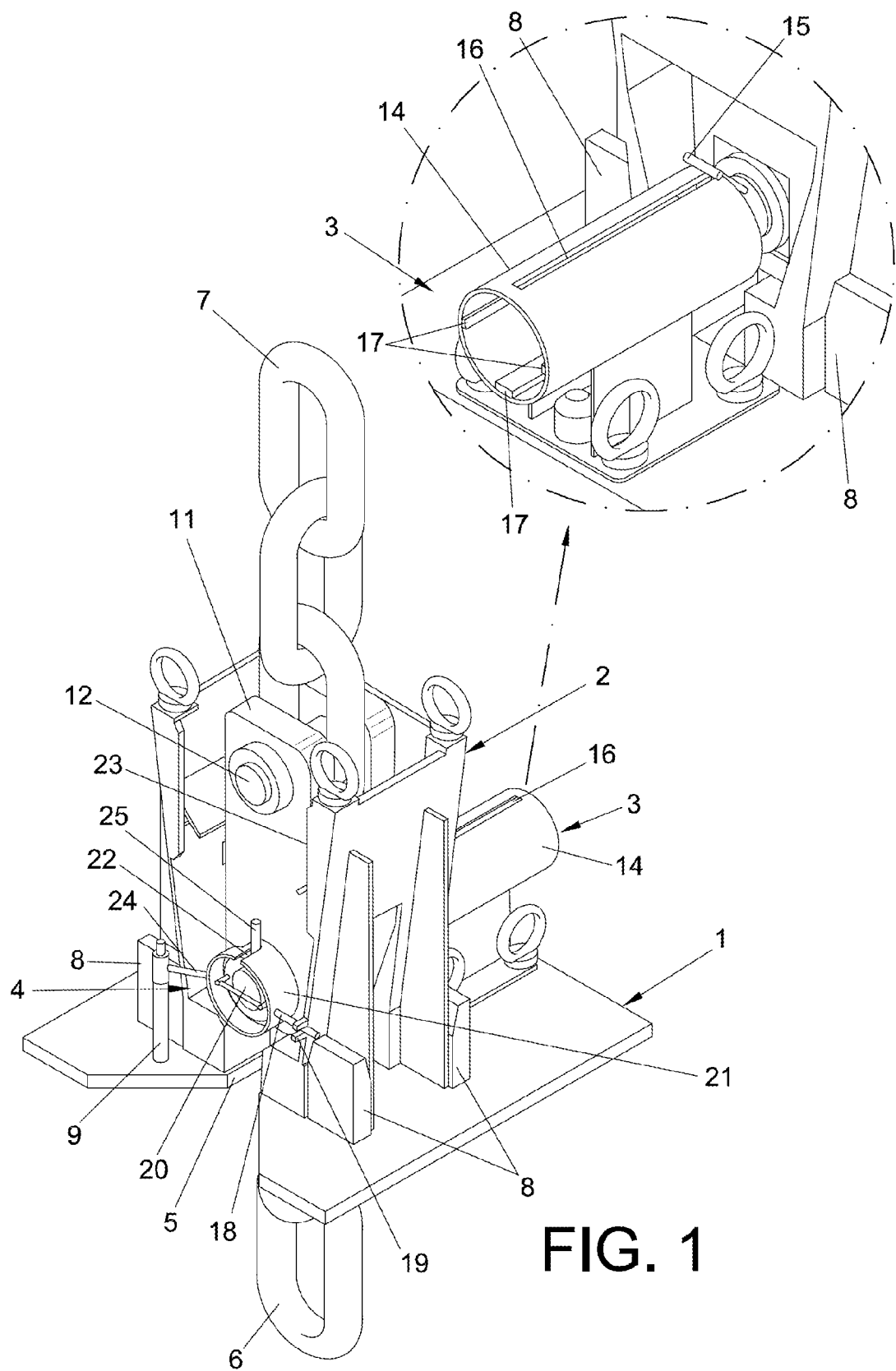
FIG. 1.—Shows a perspective view of the apparatus for vertically linking two sections of chain object of the invention. It basically comprises a lower base, a guiding bracket, an anchoring device and a locking device.
Figure 2:
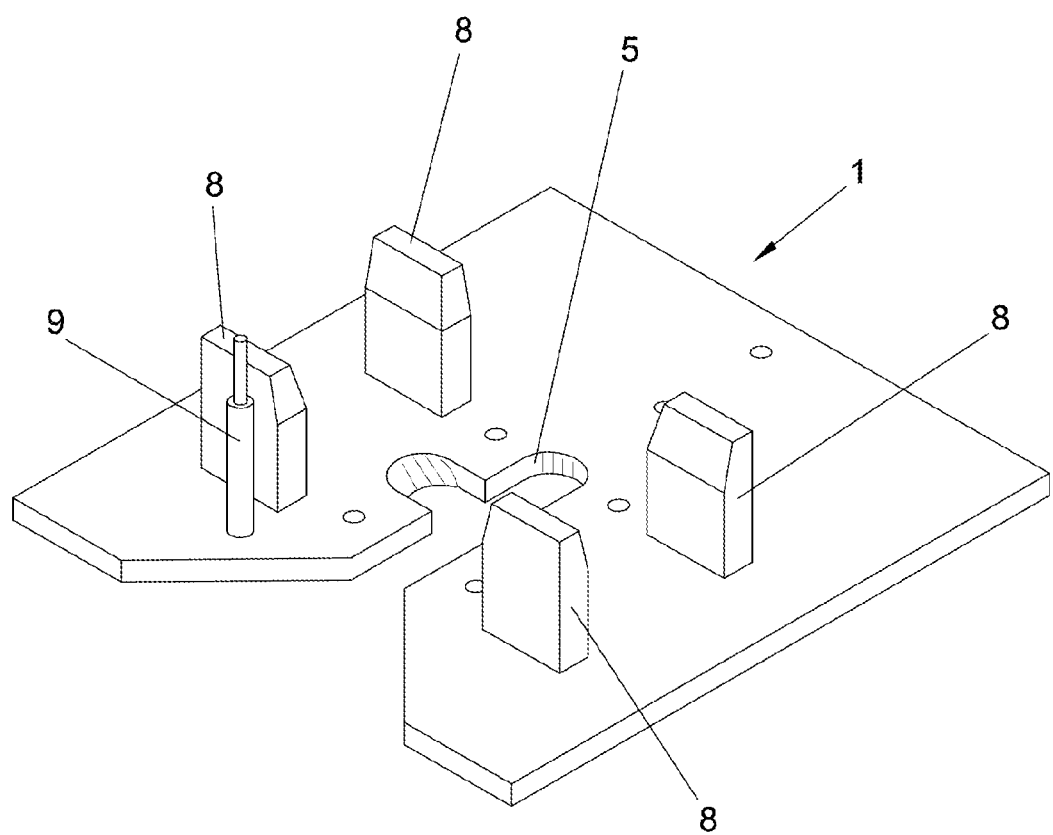
FIG. 2.—Shows a perspective view of the lower base part of the apparatus of the invention.
Figure 3:
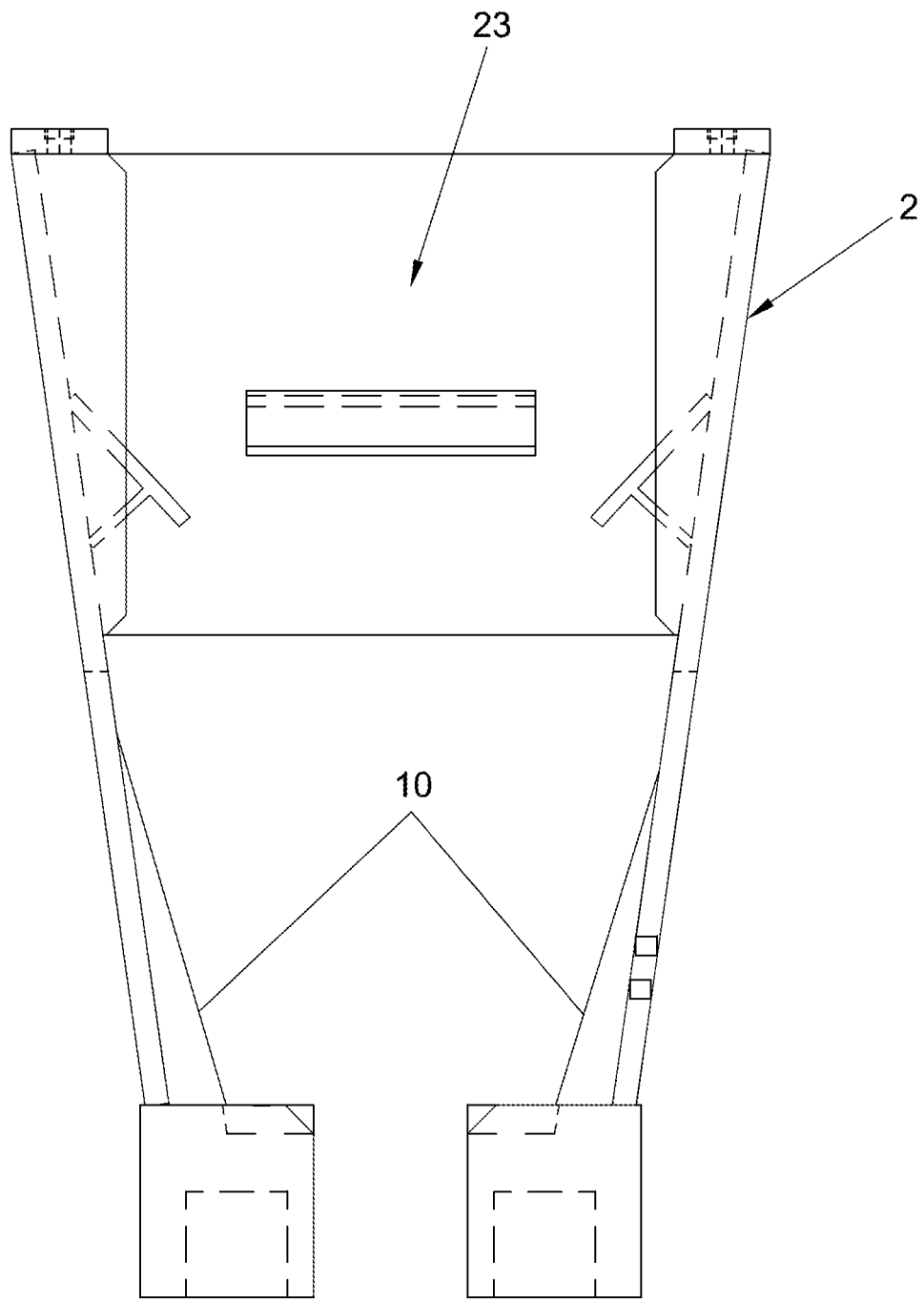
FIG. 3.—Shows an elevation view of the guiding bracket.
Figure 4:
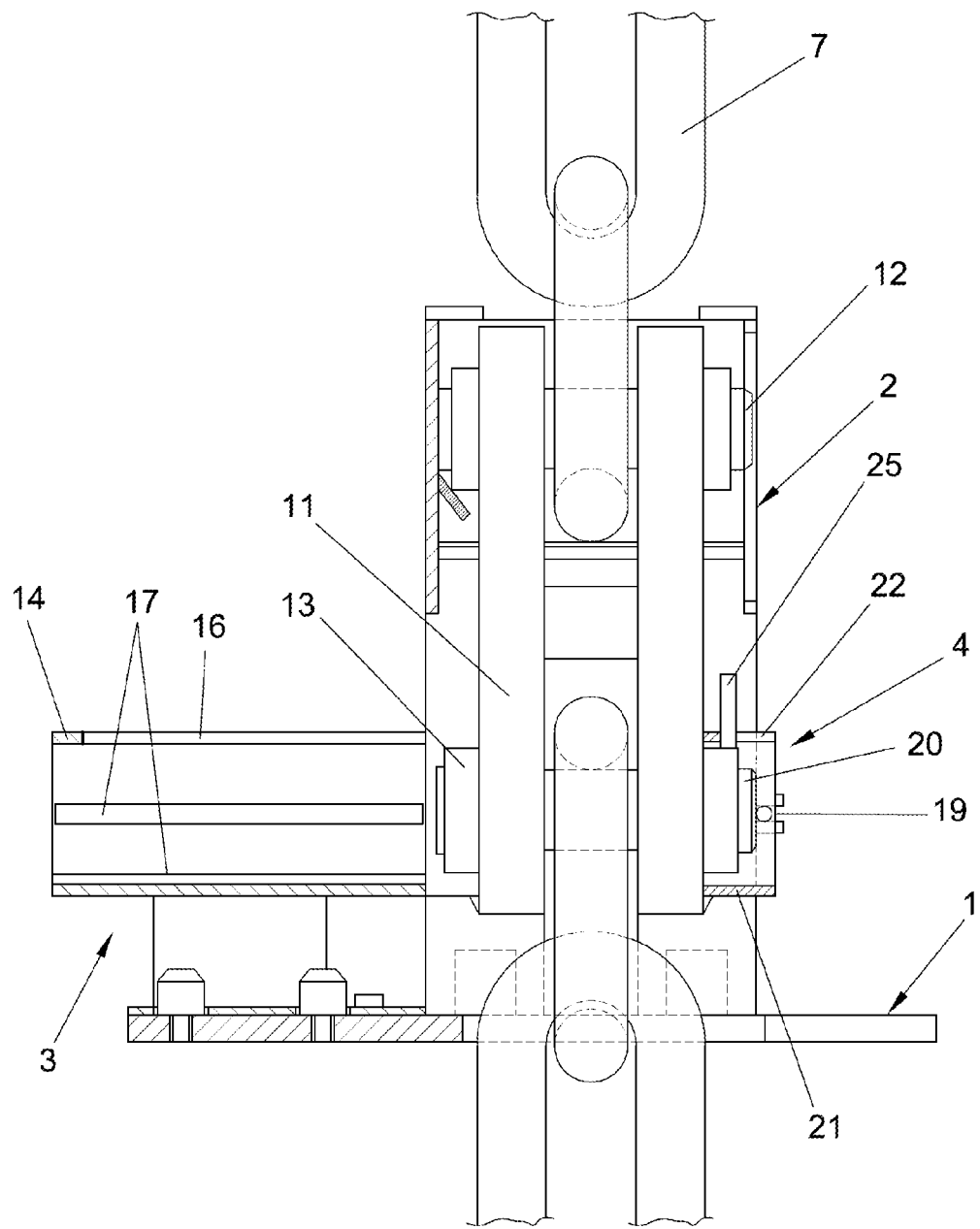
FIG. 4.—Shows a sectional view of the apparatus of the invention.

Considering the numbering adopted in the figures, the apparatus for vertically linking two chains or sections of chain comprises a lower base (1) on whose upper face a guiding bracket (2) is mounted, an assembly device (3) and also a locking device (4). The guiding bracket (2) has a surrounding configuration.

The lower base (1) includes an open cross-shaped slot (5) into which the last link of a first chain (6) is inserted from below, such that said open cross-shaped slot (5) allows to fit said link in the correct position for its subsequent linking to the other second chain (7).

The lower base (1) incorporates projections (8) intended for guiding, positioning and fixing the guiding bracket (2) on said lower base (1). This further incorporates a vertical appendix (9) onto which the locking assembly (4) is articulately coupled.

Inside the guiding bracket (2) there are two inclined planes facing each other and converging downwards for aligning a "H"-shaped shackle (11) to the correct position for subsequent attachment to the first chain (6) which is positioned in the open cross-shaped slot (5) of the lower base (1), the last link of the first chain (6) extending over said lower base (1).

Said "H"-shaped shackle (11) is attached to the last link of the second chain (7) by a first bolt (12), so that the last link of the first chain (6) is in the free space of the shackle (11) for inserting a second bolt (13) through the pair of free facing holes of the shackle (11) and through the space delimited by the last link in the first chain (6).

The assembly device (3) is fixed to the lower base (1), incorporating a tubular body (14) to which a pusher element (15) of the second bolt (13) is coupled, the pusher element (15) guided along a longitudinal groove (16) so that the second bolt (13) is inserted inside the tubular body (14) settled on longitudinal PTFE guides (17) which supports the second bolt (13) during its movement to engage to two chains (6) and (7).

The locking device (4) is articulated in the vertical appendix (9) of the lower base (1) by means of a radial arm (24), while incorporating a radial extension (18) that fits into a recess (19) of the guiding bracket (2) to ensure the stability of such locking device (4) securing it in the active position in which axially the second bolt (13) will be immobilizes by means of an anchoring sleeve (20) which is threaded on the free end section of the second bolt (13).

The locking device (4) includes an annular body (21) which serves to orient and position the anchoring sleeve (20) such annular body (21) incorporating a longitudinal groove (22) for directing a pin (25) to ensure the immobilization of the anchoring sleeve (20) once threaded onto a second bolt (13).

The guiding bracket (2) incorporates a lateral opening (23) which allows the extraction of the two chains (6) and (7) after linking them together.

With the described arrangement, the procedure for linking the two chains (6) and (7) is as follows. First, the first chain (6) existing on the seabed is placed on the lower base (1), fitting into the open cross-shaped slot (5). Subsequently the second chain (7) to be linked is lowered from the free water surface, together with the "H"-shaped shackle (11) attached to the last link of this second chain (7).

Said "H"-shaped shackle (11) adjusts to its working position thanks to the facing inclined planes (10) of the guiding bracket (2). Once the "H" shaped shackle (11) is positioned, the second bolt (13) is pushed by means of the pusher element (15) of the assembly device (3). Lastly, the locking device (4) would be closed and the anchoring sleeve (20) would be screwed onto the second bolt (13).

Once the anchoring sleeve (20) has been threaded the locking device (4) is opened and the set of the two chains (6) and (7) duly linked is extracted.

The invention claimed is:

1. An apparatus for vertically linking two sections of chain, that being intended for linking a first chain and a second chain under water, wherein the apparatus comprises:
    a lower base with an open cross-shaped slot into which a last link of the first chain is inserted, extending the last link of the first chain through said lower base;
    a guiding bracket, for guiding the second chain, attached to the lower base and aligned with the cross-shaped slot;
    an H-shaped shackle, placed inside of the guiding bracket and coupled to a last link of the second chain by a first bolt, the last link of the first chain being inserted in a free space in the H-shaped shackle and coupled to the H-shaped shackle by a second bolt, so that the last links of the first and second chains are linked to each other; and
    an assembly device and a locking device coupled to the lower base for securing the linking of the two sections of chain.

2. The apparatus for vertically linking two sections of chain, according to claim 1, wherein the lower base comprises projections intended as guiding and positioning means of the guiding bracket with respect to the lower base.

3. The apparatus for vertically linking two sections of chain, according to claim 1, wherein inside the guiding bracket there are facing inclined planes on which said H-shaped shackle sits centrally.

4. The apparatus for vertically linking two sections of chain, according to claim 1, wherein the assembly device comprises:
    a tubular body;
    a pusher element; placed inside said tubular body, coupled to the second bolt;
    a longitudinal groove along the tubular body for guiding the pusher element; and
    longitudinal guides placed inside the tubular body which support the second bolt.

5. The apparatus for vertically linking two sections of chain, according to claim 1, wherein the locking device is articulately coupled to the lower base and said locking device comprises:
    an annular body for guiding an anchoring sleeve that threads onto an end section of the second bolt;
    a radial arm having a first end attached to an outer surface of the annular body and a second, opposite end attached to a vertical appendix of the lower base, so that the radial arm can be articulated with respect to the vertical appendix; and
    a radial extension, attached to the outer surface of the annular body, which fits into a recess of the guiding bracket when the anchoring sleeve is attached.

6. The apparatus for vertically linking two sections of chain, according to claim 5, wherein the annular body of the locking device includes a longitudinal groove through which a pin can be introduced for immobilizing the anchoring sleeve.

7. The apparatus for vertically linking two sections of chain, according to claim 2, wherein inside the guiding bracket there are facing inclined planes on which said H-shaped shackle sits centrally.

8. The apparatus for vertically linking two sections of chain, according to claim 2, wherein the assembly device (3) comprises:
    a tubular body;
    a pusher element, placed inside said tubular body, coupled to the second bolt;
    a longitudinal groove along the tubular body for guiding the pusher element; and
    longitudinal guides placed inside the tubular body which support the second bolt.

9. The apparatus for vertically linking two sections of chain, according to claim 3, wherein the assembly device (3) comprises:
    a tubular body;
    a pusher element, placed inside said tubular body, coupled to the second bolt;
    a longitudinal groove along the tubular body for guiding the pusher element; and
    longitudinal guides placed inside the tubular body which support the second bolt.

10. The apparatus for vertically linking two sections of chain, according to claim 2,
    wherein the locking device is articulately coupled to the lower base and said locking device comprises:
        an annular body for guiding an anchoring sleeve that threads onto an end section of the second bolt;
        a radial arm having a first end attached to an outer surface of the annular body and a second, opposite end attached to a vertical appendix of the lower base, so that the radial arm can be articulated with respect to the vertical appendix; and
        a radial extension, attached to the outer surface of the annular body, which fits into a recess of the guiding bracket when the anchoring sleeve is attached.

11. The apparatus for vertically linking two sections of chain, according to claim 3,
   wherein the locking device is articulately coupled to the lower base and said locking device comprises:
   an annular body for guiding an anchoring sleeve that threads onto an end section of the second bolt;
   a radial arm having a first end attached to an outer surface of the annular body and a second, opposite end attached to a vertical appendix of the lower base, so that the radial arm can be articulated with respect to the vertical appendix; and
   a radial extension, attached to the outer surface of the annular body, which fits into a recess of the guiding bracket when the anchoring sleeve is attached.

12. The apparatus for vertically linking two sections of chain, according to claim 4,
   wherein the locking device is articulately coupled to the lower base and said locking device comprises:
   an annular body for guiding an anchoring sleeve that threads onto an end section of the second bolt;
   a radial arm having a first end attached to an outer surface of the annular body and a second, opposite end attached to a vertical appendix of the lower base, so that the radial arm can be articulated with respect to the vertical appendix; and
   a radial extension, attached to the outer surface of the annular body, which fits into a recess of the guiding bracket when the anchoring sleeve is attached.

* * * * *